US012705928B2

(12) United States Patent
Lyu et al.

(10) Patent No.: US 12,705,928 B2
(45) Date of Patent: Aug. 11, 2026

(54) IMAGE MATCHING METHOD AND APPARATUS, AND DEVICE AND STORAGE MEDIUM

(71) Applicant: BEIJING ZITIAO NETWORK TECHNOLOGY CO., LTD., Beijing (CN)

(72) Inventors: Shaohui Lyu, Beijing (CN); Yi Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 306 days.

(21) Appl. No.: 18/569,666

(22) PCT Filed: Jul. 13, 2022

(86) PCT No.: PCT/CN2022/105448
§ 371 (c)(1),
(2) Date: Dec. 13, 2023

(87) PCT Pub. No.: WO2023/001039
PCT Pub. Date: Jan. 26, 2023

(65) Prior Publication Data

US 2024/0282142 A1 Aug. 22, 2024

(30) Foreign Application Priority Data

Jul. 19, 2021 (CN) ......................... 202110812807.5

(51) Int. Cl.
*G06V 40/16* (2022.01)
*G06T 7/80* (2017.01)
(Continued)

(52) U.S. Cl.
CPC .............. *G06V 40/172* (2022.01); *G06T 7/80* (2017.01); *G06V 10/25* (2022.01); *G06V 40/1365* (2022.01); *G06V 2201/07* (2022.01)

(58) Field of Classification Search
CPC .. G06V 40/172; G06V 10/25; G06V 40/1365; G06V 2201/07; G06V 40/107; G06V 40/171; G06T 7/80
See application file for complete search history.

(56) References Cited

FOREIGN PATENT DOCUMENTS

| | | | |
|---|---|---|---|
| CN | 108682021 | A | 10/2018 |
| CN | 108874120 | A | 11/2018 |

(Continued)

OTHER PUBLICATIONS

English translation of CN110007765A (Year: 2019).*

(Continued)

*Primary Examiner* — Wassim Mahrouka
(74) *Attorney, Agent, or Firm* — Astute IP Law Group

(57) ABSTRACT

Provided in the present disclosure are an image matching method and apparatus, and a device and a storage medium. The method comprises: first determining an image to be matched, and performing target object identification on said image; in response to it being determined that a target object is present in said image, determining, in said image, a box to be matched that includes the target object, and acquiring information to be matched that corresponds to said box; matching said information corresponding to said box with calibration box information corresponding to said image, so as to obtain a matching result of the calibration box information; and determining a matching result of said image on the basis of the matching result.

18 Claims, 5 Drawing Sheets determining, from the calibration box information corresponding to said plurality of calibration boxes respectively, the calibration box information of the calibration box which has not been marked with a preset identifier

↓ matching the to-be-matched information corresponding to the to-be-matched box based on the calibration box information of the calibration box which has not been marked with a preset identifier, and, upon successful matching, to mark the calibration box which is successfully matched with the to-be-matched information corresponding to the to-be-matched box with the preset identifier

↓ determining a matching result of the calibration box information based on the marking conditions of the plurality of calibration boxes for the preset identifier

(51) Int. Cl.

| | |
|---|---|
| ***G06V 10/25*** | (2022.01) |
| ***G06V 40/12*** | (2022.01) |

(56) References Cited

FOREIGN PATENT DOCUMENTS

| | | | |
|---|---|---|---|
| CN | 109194879 | A | 1/2019 |
| CN | 110007765 | A | 7/2019 |
| CN | 110177206 | A | 8/2019 |
| CN | 110334600 | A | 10/2019 |
| CN | 111985385 | A | 11/2020 |
| CN | 111986252 | A | 11/2020 |
| CN | 112184802 | A | 1/2021 |

OTHER PUBLICATIONS

English translation of CN112184802A (Year: 2021).*
Office Action received for Chinese Patent Application No. 202110812807.5, mailed on Jul. 16, 2025, 20 pages (10 pages of English Translation and 10 pages of Original Office Action).
International Search Report issued in PCT/CN2022/105448 (English Translation), dated Oct. 10, 2022, 2 pages provided.

* cited by examiner

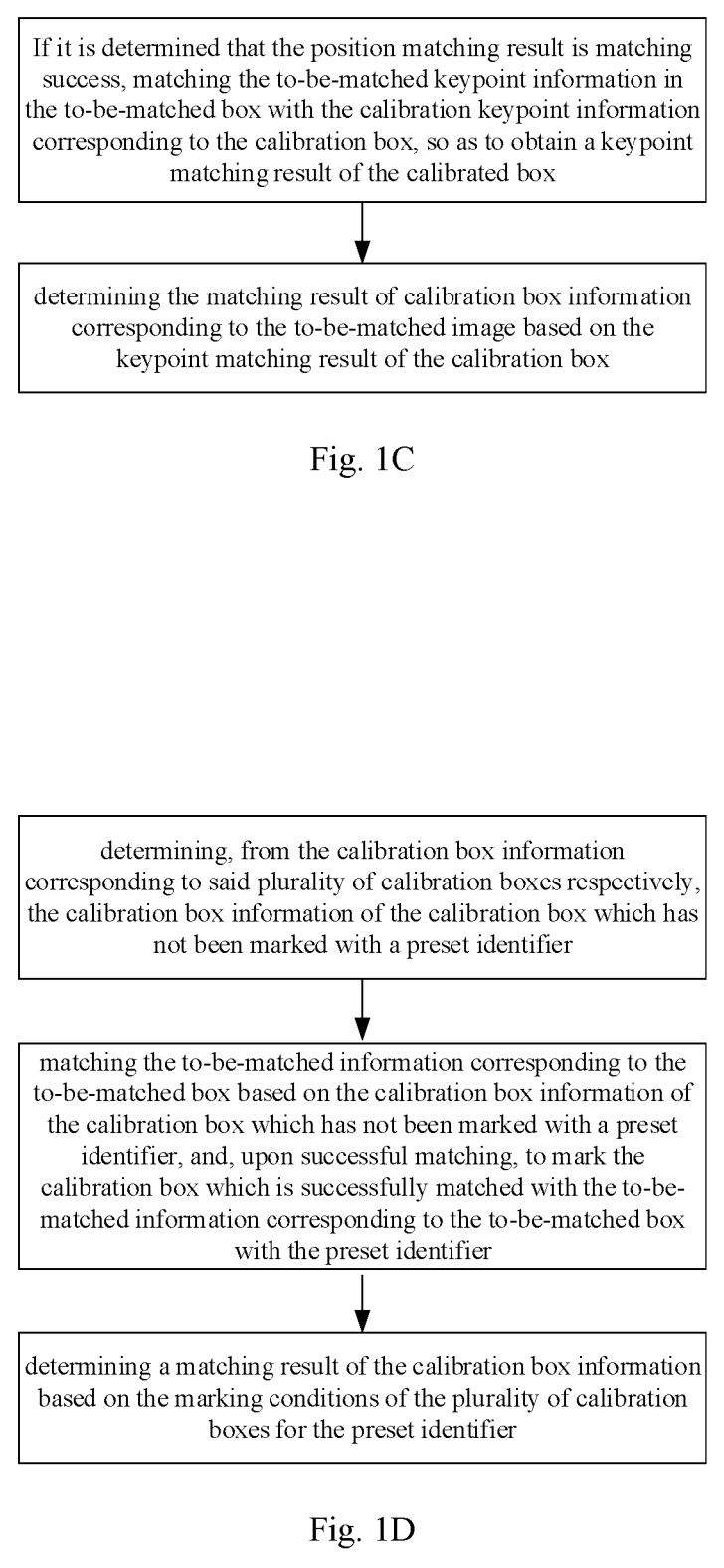

If it is determined that the position matching result is matching success, matching the to-be-matched keypoint information in the to-be-matched box with the calibration keypoint information corresponding to the calibration box, so as to obtain a keypoint matching result of the calibrated box

↓ determining the matching result of calibration box information corresponding to the to-be-matched image based on the keypoint matching result of the calibration box

Fig. 1C determining, from the calibration box information corresponding to said plurality of calibration boxes respectively, the calibration box information of the calibration box which has not been marked with a preset identifier

↓ matching the to-be-matched information corresponding to the to-be-matched box based on the calibration box information of the calibration box which has not been marked with a preset identifier, and, upon successful matching, to mark the calibration box which is successfully matched with the to-be-matched information corresponding to the to-be-matched box with the preset identifier

↓ determining a matching result of the calibration box information based on the marking conditions of the plurality of calibration boxes for the preset identifier

Fig. 1D

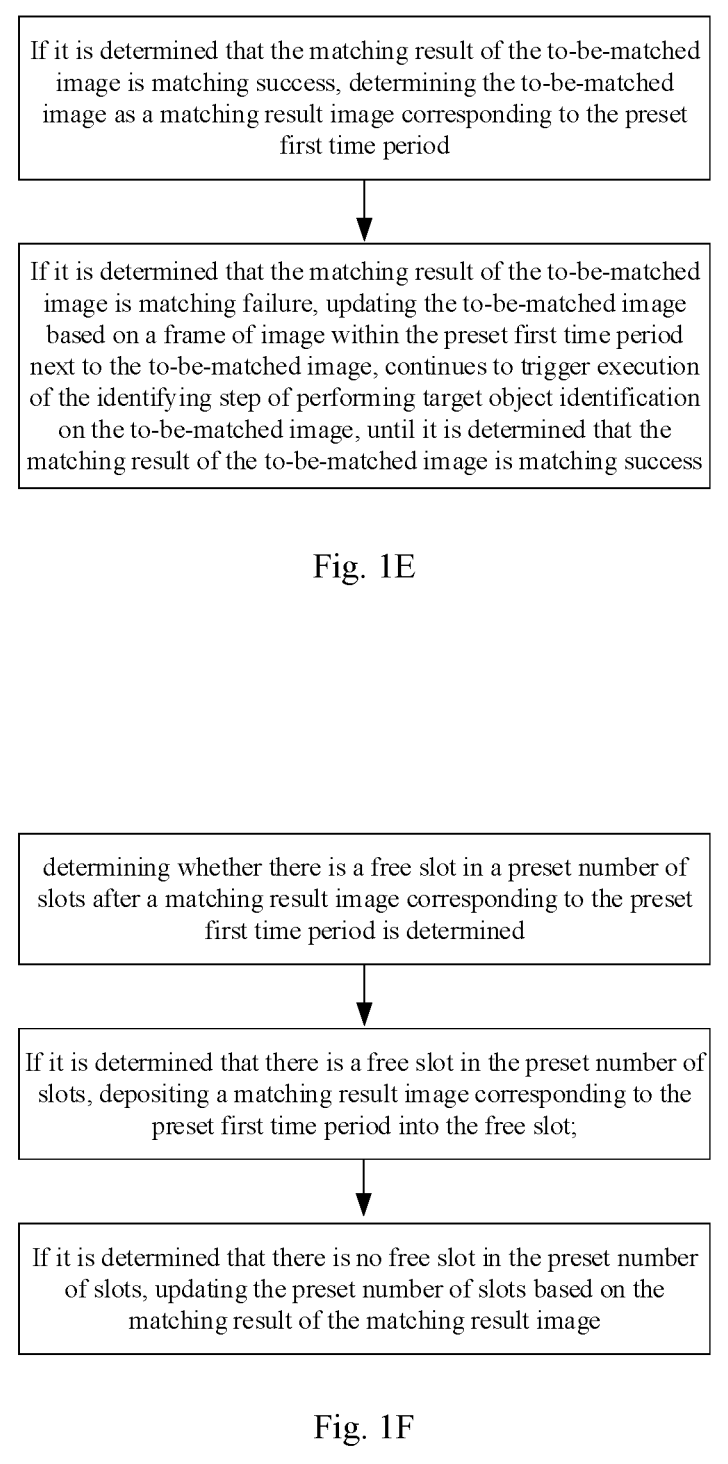

If it is determined that the matching result of the to-be-matched image is matching success, determining the to-be-matched image as a matching result image corresponding to the preset first time period If it is determined that the matching result of the to-be-matched image is matching failure, updating the to-be-matched image based on a frame of image within the preset first time period next to the to-be-matched image, continues to trigger execution of the identifying step of performing target object identification on the to-be-matched image, until it is determined that the matching result of the to-be-matched image is matching success

Fig. 1E determining whether there is a free slot in a preset number of slots after a matching result image corresponding to the preset first time period is determined If it is determined that there is a free slot in the preset number of slots, depositing a matching result image corresponding to the preset first time period into the free slot;

If it is determined that there is no free slot in the preset number of slots, updating the preset number of slots based on the matching result of the matching result image

Fig. 1F

IMAGE MATCHING METHOD AND APPARATUS, AND DEVICE AND STORAGE MEDIUM

CROSS-REFERENCE OF RELATED APPLICATION

This application is a national stage of International Application No. PCT/CN2022/105448, filed on Jul. 13, 2022, which claims the priority of a Chinese patent application No. 202110812807.5 filed in China Patent Office on Jul. 19, 2021, both of the aforementioned applications are hereby incorporated by reference in their entireties.

FIELD OF THE INVENTION

The present disclosure relates to the field of image processing, and relates, for example, to an image matching method, apparatus, device, and storage medium.

BACKGROUND

As image and video processing technologies continue to develop, there are more and more image and video application products, and a wider variety of play styles are supported.

At present, how to further enrich functions of image and video application products and enhance user's experience is a technical problem that needs to be solved urgently.

DISCLOSURE OF THE INVENTION

The present disclosure provides an image matching method, apparatus, device, and storage medium that can enrich functions of image and video application products and enhance user's experience.

In a first aspect, the present disclosure provides an image matching method, the method comprising:

- determining a to-be-matched image and performing target object identification on said to-be-matched image;
- in response to it being identified that a target object is present in said to-be-matched image, determining, in said to-be-matched image, a to-be-matched box that contains the target object, and acquiring to-be-matched information that corresponds to said to-be-matched box;
- matching said to-be-matched information corresponding to said to-be-matched box with calibration box information corresponding to said to-be-matched image, so as to obtain a matching result of the calibration box information; wherein the calibration box information is obtained based on reference line calibration shown on a standard image corresponding to said to-be-matched image; and
- determining a matching result of said to-be-matched image on the basis of the matching result of the calibration box information.

In a second aspect, the present disclosure provides an image matching apparatus, said apparatus comprising:

- a first identification module configured to determine a to-be-matched image and perform target object identification on said to-be-matched image;
- a first acquisition module configured to, in response to it being identified that a target object is present in said to-be-matched image, determine, in said to-be-matched image, a to-be-matched box that contains the target object, and acquire to-be-matched information that corresponds to said to-be-matched box;
- a first matching module configured to match said to-be-matched information corresponding to said to-be-matched box with calibration box information corresponding to said to-be-matched image, so as to obtain a matching result of the calibration box information; wherein the calibration box information is obtained based on reference line calibration shown on a standard image corresponding to said to-be-matched image;
- a first determination module configured to determine a matching result of said to-be-matched image on the basis of the matching result of the calibration box information.

In a third aspect, the present disclosure provides a computer-readable storage medium, said computer-readable storage medium having instructions stored therein which, when running on a terminal device, cause said terminal device to implement the method as described above.

In a fourth aspect, the present disclosure provides a device comprising: a memory, a processor, and a computer program stored on said memory and executable on said processor, said processor, when executing said computer program, implements the method as described above.

In a fifth aspect, the present disclosure provides a computer program product, said computer program product comprising computer programs/instructions, said computer programs/instructions, when executed by a processor, causing said processor to implement the method as described above.

DESCRIPTION OF THE DRAWINGS

The accompanying drawings herein are incorporated into and form a part of the specification, illustrate embodiments consistent with the present disclosure, and are used to explain the principles of the present disclosure in conjunction with the specification.

FIG. 1A to 1F each illustrates a flowchart of an image matching method provided by an embodiment of the present disclosure;

DETAILED DESCRIPTION OF PREFERRED EMBODIMENTS

Embodiments of the present disclosure will be further described below. It is noted that embodiments and features in embodiments of the present disclosure may be combined with each other without conflict.

Many specific details are set forth in the following description in order to facilitate a full understanding of the present disclosure, but the present disclosure may also be implemented in other ways than those described herein; obviously, the embodiments in the specification are only some of embodiments of the present disclosure, and not all of the embodiments.

In order to continuously enrich types of gameplay supported by image and video application products, embodiments of the present disclosure provide an image matching method, in which, first determining an to-be-matched image, and performing target object identification on said to-be-matched image; in response to it being determined that a target object is present in said to-be-matched image, determining, in said to-be-matched image, a to-be-matched box that contains the target object, and acquiring to-be-matched information that corresponds to said to-be-matched box, then matching said to-be-matched information corresponding to said to-be-matched box with calibration box information corresponding to said to-be-matched image, so as to obtain a matching result of the calibration box information; and finally based on the matching result, determining a matching result of said to-be-matched image. An embodiment of the present disclosure determines the matching result of the to-be-matched image by matching with a pre-calibrated calibration box information corresponding to the to-be-matched image, and based on the image matching method provided in embodiments of the present disclosure, functions of the image and video application products can be enriched, and the user's experience of using the application products can be improved.

Figure 1A:
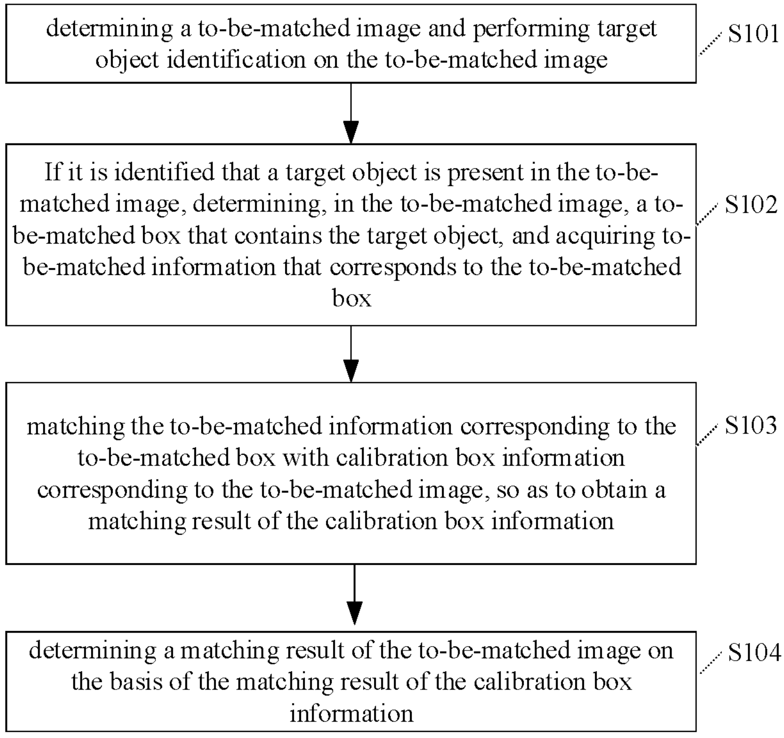

To this end, an embodiment of the present disclosure provides an image matching method, and with reference to FIG. 1A which illustrates a flowchart of an image matching method provided by the embodiment of the present disclosure, the method comprises:

S101: determine a to-be-matched image and performing target object identification on the to-be-matched image.

The to-be-matched image in the embodiment of the present disclosure may be a frame of image acquired from continuous frames of images captured by a camera, an image uploaded by the user or received from other terminals, and the like. For example, the to-be-matched image may include a portrait image, an object image, and the like.

The target object in the embodiment of the present disclosure may include a part of body such as a human face, a hand, a leg, or may also be a plurality of articles, or may also be a preset text and the like. Among them, the target object may include one or more objects. For example, if the target object may include a human face, it is possible to perform face recognition on the to-be-matched image. Another example is that the target object may include both a human face and a hand, then it is possible to perform face recognition and hand recognition on the to-be-matched image, and subsequently obtain a to-be-matched box that contains the human face and a to-be-matched box that contains the hand.

In practice, it is possible to perform identification on the to-be-matched image based on features of the target object, to determine whether a preset object is present in the to-be-matched image or not. For example, face recognition can be performed on a to-be-matched image based on features of human face to determine whether a human face is present in the to-be-matched image or not. Specific face recognition algorithms are not limited in the embodiments of the present disclosure.

S102: if it is identified that the target object is present in the to-be-matched image, determine a to-be-matched box in the to-be-matched image containing the target object, and obtain to-be-matched information corresponding to the to-be-matched box.

In an embodiment of the present disclosure, when it is determined that a target object is present in a to-be-matched image, a to-be-matched box containing the target object is determined in the to-be-matched image. For example, assuming that the target object is a human face, when a human face is recognized in the to-be-matched image, a to-be-matched box containing the human face, i.e., a face box to-be-matched, is determined on the to-be-matched image. The to-be-matched box may be a smallest rectangular box on the to-be-matched image that contains the target object.

In an example implementation, one or more to-be-matched boxes may be determined on the to-be-matched image. For example, when a plurality of human faces are recognized in the to-be-matched image, a plurality of face boxes may be determined on the to-be-matched image, each to-be-matched face box containing a human face respectively. As another example, when a human face and a hand are recognized in the to-be-matched image, a to-be-matched box containing a human face and a to-be-matched box containing a hand may be determined on the to-be-matched image.

In an embodiment of the present disclosure, after a to-be-matched box is determined on the to-be-matched image, to-be-matched information corresponding to the to-be-matched box is acquired. Among other things, the to-be-matched information corresponding to the to-be-matched box may include information of the to-be-matched box that can be used to characterize the target object in the to-be-matched box, such as to-be-matched position information, to-be-matched keypoint information, and the like.

For example, the to-be-matched information corresponding to the to-be-matched face box may include position information of the face box, keypoint information of facial organs on the human face in the to-be-matched face box, and the like. For example, the to-be-matched information corresponding to the to-be-matched box may be acquired, for example, by means of image recognition, etc.

S103: match the to-be-matched information corresponding to the to-be-matched box with calibration box information corresponding to the to-be-matched image, so as to obtain a matching result of the calibration box information.

Wherein the calibration box information is obtained based on reference line calibration shown on a standard image corresponding to the to-be-matched image.

In an embodiment of the present disclosure, after the to-be-matched information corresponding to the to-be-matched box on the to-be-matched image is acquired, the to-be-matched information corresponding to the to-be-matched box is matched with the calibration box information corresponding to the to-be-matched image so as to determine whether the calibration box information corresponding to the to-be-matched image is successfully matched or not.

In an exemplary implementation, the calibration box information corresponding to the to-be-matched image is obtained based on reference line calibration shown on a standard image corresponding to the to-be-matched image. Typically, the standard image corresponding to the to-be-matched image includes one or more reference lines, e.g., the reference lines on the standard image may be pose lines capable of representing a portrait pose in the standard image, etc.

Figure 2:
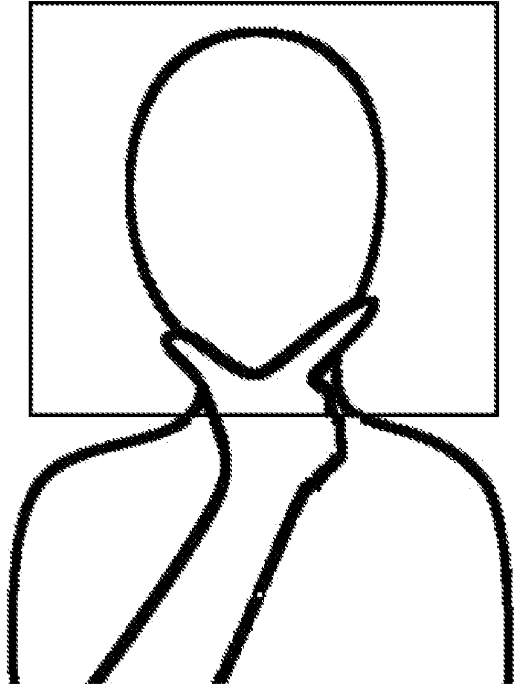
FIG. 2 is a schematic diagram of a standard image with reference lines provided by an embodiment of the present disclosure.

FIG. 2 is a schematic diagram of a standard image with reference lines provided by an embodiment of the present disclosure. Based on the reference line shown on the standard image, a user can calibrate a calibration box on the standard image, such as a calibration box containing a human face shown in FIG. 2. By recognizing position coordinates of the calibration box, calibration position information corresponding to this calibration box can be obtained, which is used to constitute calibration box information corresponding to the calibration box. If a plurality of calibration boxes are calibrated on the standard image, the calibration box information corresponding to the standard image includes calibration box information corresponding to the plurality of calibration boxes respectively.

Figure 1B:
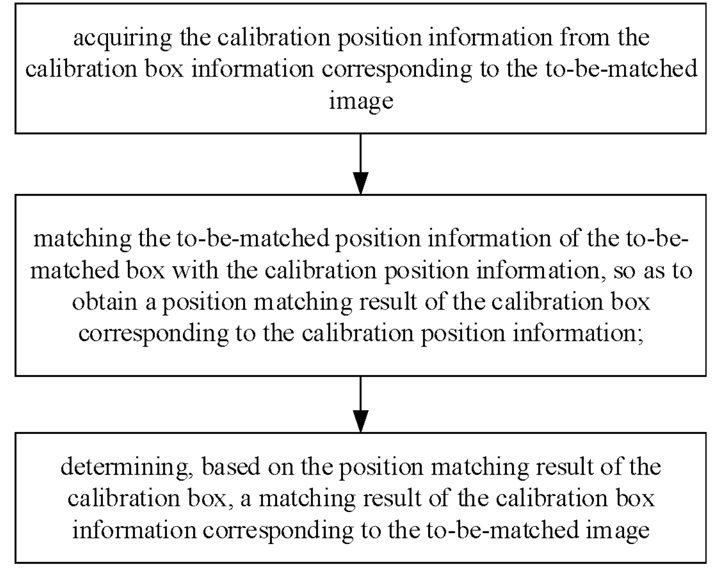

In practical application, after acquiring the calibration box information corresponding to the to-be-matched image, acquire calibration position information from the calibration box information corresponding to the to-be-matched image, and then match the to-be-matched position information of the to-be-matched box with the calibration position information, so as to obtain a position matching result of the calibration box corresponding to the calibration position information, and determine, based on the position matching result of the calibration box, a matching result of the calibration box information corresponding to the to-be-matched image, as shown in FIG. 1B. For example, when it is determined that the to-be-matched position information of the to-be-matched box is successfully matched with the calibration position information, it is determined that the calibration box corresponding to the calibration position information is successfully matched.

In addition, the calibration box information may also include calibration keypoint information which is pre-configured for the calibration box for characterizing features of a target object contained in the calibration box, for example, the target object may be a human face, a hand, a foot, etc., and the calibration keypoint information may include face keypoint information, hand keypoint information, or foot keypoint information, etc.

As shown in FIG. 2, the calibration box is a calibration box for a human face, and the calibration keypoint information pre-configured for the calibration box may be keypoint information of facial organs, which is used to characterize the expression features that need to be matched by the human face contained in the calibration box.

For example, the keypoint information of facial organs may include position information of the keypoints of the facial organs and information about position relationship among the keypoints of the facial organs, etc., which is capable of characterizing the feature information of the facial expression.

Assuming that the calibration box is a calibration box for a hand or a foot, the calibration keypoint information pre-configured for the calibration box includes calibration action keypoint information for characterizing motion features of the hand or foot to be matched in the calibration box.

In an embodiment of the present disclosure, first matching the to-be-matched position information of the to-be-matched box with the calibration position information, so as to obtain a position matching result of the calibrated box corresponding to the calibration position information. If it is determined that the position matching result is a successful match, then matching to-be-matched keypoint information in said to-be-matched box with the calibration keypoint information corresponding to the calibration box, so as to obtain a keypoint matching result of the calibration box, and based on the keypoint matching result of the calibration box, determine a matching result of the calibration box information corresponding to the to-be-matched image, as shown in FIG. 1C.

In practice, the to-be-matched position information of the to-be-matched box is matched with the calibration position information so as to obtain a position matching result of the calibration box corresponding to the calibration position information. Then, when it is determined that the position matching result is matching success, the to-be-matched keypoint information is matched with the calibration keypoint information corresponding to the calibration box, so as to obtain a keypoint matching result of the calibrated box. If it is determined that the position matching result is matching failure, there is no need to continue to perform matching for the to-be-matched keypoint information of the to-be-matched box, so that the matching efficiency can be improved and system resources can be saved.

In an exemplary implementation, calibration position information and calibration keypoint information corresponding to the calibration box may be utilized to form calibration box information corresponding to the calibration box. Typically, the calibration box information is saved in the form of a json file. The present disclosure does not limit the form in which the calibration box information may be saved.

For ease of understanding, assuming that the to-be-matched box on the to-be-matched image contains a human face, after acquiring the to-be-matched information corresponding to the to-be-matched box, the to-be-matched information is matched with the calibration box information corresponding to the to-be-matched image. Among other things, the to-be-matched information corresponding to the to-be-matched box may include keypoint information of the human face contained in the to-be-matched box and position information of the to-be-matched box, and the like. For example, after extracting the keypoint information of the human face contained in the to-be-matched box and acquiring the position information of the to-be-matched box, the keypoint information of the human face and the position information are matched with the calibration box information corresponding to the to-be-matched image, respectively, wherein the calibration box information includes calibration keypoint information and calibration position information. If it is determined that the keypoint information of the human face and the position information of the to-be-matched box are successfully matched with the calibration box information of the same calibration box, it is stated that the calibration box is successfully matched. In case it is determined that at least one of the calibration keypoint information and the calibration position information in the calibration box information of the calibration box is not successfully matched, then it is determined that the matching result of the calibration box is matching failure. Among other things, the algorithm for extracting the keypoints of the human face is not limited in embodiments of the present disclosure.

In an exemplary implementation, a plurality of to-be-matched boxes may be included on the to-be-matched image, and for each to-be-matched box, corresponding to-be-matched information is determined respectively, and the to-be-matched information corresponding to each to-be-matched box is matched with the calibration box information corresponding to the to-be-matched image, so as to determine a matching result of the calibration box information corresponding to the to-be-matched image.

S104: based on the matching result of the calibration box information, determine a matching result of the to-be-matched image.

In an embodiment of the present disclosure, after matching the to-be-matched information corresponding to the to-be-matched box on the to-be-matched image with the calibration box information corresponding to the to-be-matched image, if it is determined that the calibration box information corresponding to the to-be-matched image is successfully matched, then it can be determined that the matching result of the to-be-matched image is matching success.

If it is determined that there exists, in the calibration box information corresponding to this to-be-matched image, calibration box information that has not been successfully matched, it is determined that the matching result of the calibration box information is matching failure, and therefore, it may also be determined that the matching result of the to-be-matched image is also matching failure.

In the image matching method provided by embodiments of the present disclosure, first, determining an to-be-matched image, and performing target object identification on the to-be-matched image; if it is determined that a target object is present in the to-be-matched image, determining, in the to-be-matched image, a to-be-matched box that contains the target object, and acquiring to-be-matched information that corresponds to the to-be-matched box, then matching the to-be-matched information corresponding to the to-be-matched box with calibration box information corresponding to the to-be-matched image, so as to obtain a matching result of the calibration box information; and finally based on the matching result, determining a matching result of the to-be-matched image. An embodiment of the present disclosure determines the matching result of the to-be-matched image by matching with a pre-calibrated calibration box information corresponding to the to-be-matched image, and based on the image matching method provided in the embodiment of the present disclosure, functions of image and video application products can be enriched, and the user's experience of using the application products can be improved.

In an exemplary implementation, the calibration box information corresponding to the to-be-matched image may include calibration box information corresponding to a plurality of calibration boxes respectively. Take a standard image showing reference lines corresponding to a plurality of target objects as an example. For example, based on the reference lines shown on the standard image, calibration box information of the calibration boxes corresponding to three human faces respectively can be calibrated, and by matching the to-be-matched information of a to-be-matched box on the to-be-matched image with the pre-calibrated calibration box information of the calibration boxes corresponding to the three human faces respectively, a matching result of the calibration box information corresponding to the to-be-matched image can be obtained.

Assuming that three human faces are included in the to-be-matched image, and that the to-be-matched information of the three human faces is successfully matched with the calibration box information of the calibration boxes of the three human faces that are pre-calibrated respectively, it can be determined that the matching result of the calibration box information corresponding to the to-be-matched image is matching success, and it can be further determined that the matching result of the to-be-matched image is matching success.

In an exemplary implementation, the calibration box information corresponding to the to-be-matched image includes calibration box information corresponding to the plurality of calibration boxes respectively. After acquiring the to-be-matched information corresponding to the to-be-matched box on the to-be-matched image, the to-be-matched information is matched with the calibration box information of a calibration box of the plurality of calibration boxes that has not been marked with a preset identifier, and, upon matching success, the calibration box with which the to-be-matched information corresponding to the to-be-matched box is successfully matched is marked with the preset identifier to indicate that the calibration box has been successfully matched. Based on marking situation of each calibration box corresponding to the to-be-matched image with respect to the preset identifier, the matching result of the calibration box information is determined, as shown in FIG. 1D.

For example, if it is determined that the plurality of calibration boxes are all marked with the preset identifier, it is determined that the matching result of the calibration box information is matching success; if it is determined that at least one of the plurality of calibration boxes is not marked with the preset identifier, it is determined that the matching result of the calibration box information is matching failure.

The image matching method provided by embodiments of the present disclosure is capable of realizing a multi-person interaction function, enriching functions of image and video application products, and enhancing the user's experience by matching with calibration box information of a plurality of calibration boxes corresponding to the pre-calibrated to-be-matched image, respectively.

Based on the above embodiments, an embodiment of the present disclosure also provides an application scenario embodiment of the image matching method, wherein the to-be-matched image in the embodiment of the present disclosure may belong to a frame of image in consecutive frames of images in a preset first time period, for example, 0-1 seconds since turning on the camera to start shooting is the preset first time period, and 1-2 second may also be the preset first time period.

In practice, the image matching method provided based on embodiments of the present disclosure is capable of determining a matching result for each of the consecutive frames of images within the preset first time period, and then, based on the matching result for each frame of image, a matching result image corresponding to the preset first time period can be finally determined.

In an exemplary implementation, if it is determined that the matching result of the to-be-matched image within the preset first time period is matching success, the to-be-matched image is determined as a matching result image corresponding to the preset first time period. If it is determined that the matching result of the to-be-matched image within the preset first time period is matching failure, updating the to-be-matched image based on a frame of image within the preset first time period next to the to-be-matched image, continues to trigger execution of the step of performing target object identification on the to-be-matched image, until it is determined that the matching result of the to-be-matched image is matching success, as shown in FIG. 1E.

Assuming that the to-be-matched image is the 8th frame of image within 0-1 seconds, if the matching result of the 8th frame of image is matching success, the 8th frame of image may be determined as the matching result image corresponding to the time period of 0-1 seconds, and no further matching may be performed for subsequent frames within the time period of 0-1 seconds. If the matching result of the 8th frame image is matching failure, the matching for the 9th frame image within the time period of 0-1 seconds is continued, until a first image within the time period of 0-1 seconds which is successfully matched is obtained, and determined as the matching result image corresponding to the time period of 0-1 seconds.

In an embodiment of the present disclosure, the preset first time period belongs to one of a plurality of preset time periods, assuming that the plurality of preset time periods includes a preset first time period, a preset second time period, and a preset third time period, and the preset first time period, the preset second time period, and the preset third time period are three consecutive time periods, for example, 0-1 seconds, 1-2 seconds, and 2-3 seconds since the camera is turned on to start shooting respectively.

In practice, after determining the matching result image corresponding to each of the preset time periods respectively, a preset number of target output images are determined from the determined individual matching result images, and then, the preset number of target output images are displayed. For example, from the matching result images corresponding to each of the preset first time period, the preset second time period, and the preset third time period, two target output images are determined for being displayed on a device interface.

In an exemplary implementation, in order to improve the user's experience, a matching result image in which the matching result is matching success is preferentially displayed on the device interface. For example, a preset number of successful matching result images may be randomly determined from a plurality of matching result images corresponding to a plurality of preset time periods, respectively, to be displayed on the device interface.

In another exemplary implementation, a preset number of slots are predetermined for storing target output images, i.e., images displayed on the device interface. Among other things, a slot can be understood as a pit in a storage space for storing a subject or an object, and an original subject or object would be extruded when other subjects or objects enter. In an embodiment of the present disclosure, each slot is used to store an image, assuming that image A has been stored in the slot, and if image B is to be deposited into the slot, image A in the slot would be extruded, and at that time, the slot would be occupied by image B. After determining the matching result image corresponding to the preset first time period, it is first determined whether there is any free one in the preset number of slots, and if there is a free slot, the matching result image is deposited into the free slot. If no free slot exists, an occupied slot is updated based on the matching result of the matching result image, as shown in FIG. 1F.

In an exemplary embodiment, updating the occupied slot based on the matching result of the matching result image, a preset number of images may be randomly determined from the matching result image and the images occupying slots, and the determined preset number of images may be stored in the slots.

The image matching method provided by an embodiment of the present disclosure displays an image occupying a slot on a device interface, which can realize the effect of displaying a successfully matched image on the device interface preferentially and randomly.

Figure 3:
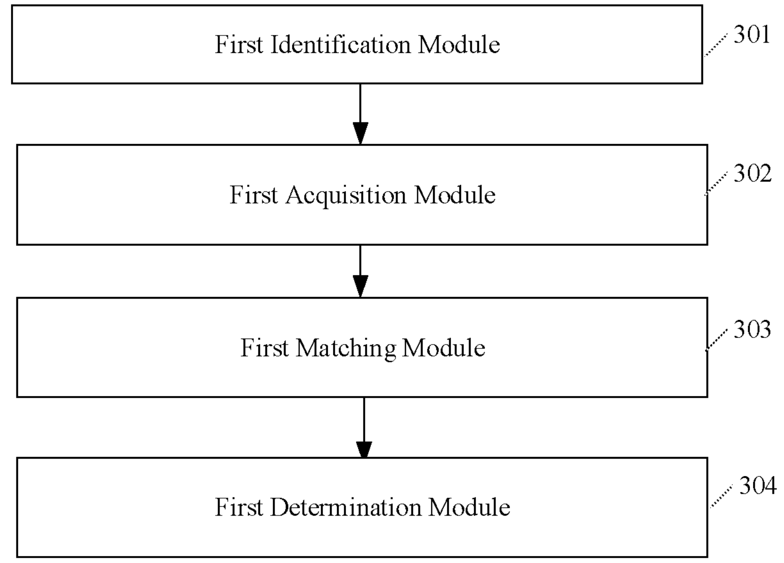
FIG. 3 illustrates a schematic structural diagram of an image matching apparatus provided by an embodiment of the present disclosure.

Based on the above method embodiments, the present disclosure also provides an image matching apparatus, and with reference to FIG. 3 which illustrates a schematic structural diagram of an image matching apparatus provided by an embodiment of the present disclosure, said apparatus comprises:

- a first identification module 301 configured to determine a to-be-matched image and perform target object identification on said to-be-matched image;
- a first acquisition module 302 configured to, in response to it being identified that a target object is present in said to-be-matched image, determine, on said to-be-matched image, a to-be-matched box that contains the target object, and acquire to-be-matched information that corresponds to said to-be-matched box;
- a first matching module 303 configured to match the to-be-matched information corresponding to the to-be-matched box with calibration box information corresponding to the to-be-matched image, so as to obtain a matching result of the calibration box information; wherein the calibration box information is obtained based on reference line calibration shown on a standard image corresponding to the to-be-matched image;
- a first determination module 304 configured to determine a matching result of the to-be-matched image on the basis of the matching result of the calibration box information.

In an exemplary implementation, the calibration box information comprises calibration position information of the calibration box obtained based on the reference line calibration shown on the standard image, and the to-be-matched information corresponding to the to-be-matched box comprises to-be-matched position information of the to-be-matched box;

The first matching module comprises:

- a first acquisition submodule configured to acquire the calibration position information from the calibration box information corresponding to the to-be-matched image;
- a first matching submodule configured to match the to-be-matched position information of the to-be-matched box with the calibration position information, so as to obtain a position matching result of the calibration box corresponding to the calibration position information;
- a first determination sub-module configured to determine, based on the position matching result of the calibration box, a matching result of the calibration box information corresponding to the to-be-matched image.

In an exemplary implementation, the calibration box information further comprises calibration keypoint information pre-configured for the calibration box, and the to-be-matched information corresponding to the to-be-matched box comprises to-be-matched keypoint information in the to-be-matched box;

The first matching module further comprises:

- a second matching submodule configured to when it is determined that the position matching result is matching success, match the to-be-matched keypoint information in the to-be-matched box with the calibration keypoint information corresponding to the calibration box, so as to obtain a keypoint matching result of the calibrated box;

The first determination submodule is configured to:

determine the matching result of calibration box information corresponding to the to-be-matched image based on the keypoint matching result of the calibration box.

In an exemplary implementation, the target object comprises a hand and/or a foot, and the calibration keypoint information comprises hand keypoint information and/or foot keypoint information.

In an exemplary implementation, the calibration box information corresponding to the to-be-matched image comprises calibration box information corresponding to each of the plurality of calibration boxes;

The first matching module comprises:

- a second determination sub-module configured to determine, from the calibration box information corresponding to said plurality of calibration boxes respectively, the calibration box information of the calibration box which has not been marked with a preset identifier;

wherein the preset identifier is used to characterize that the corresponding calibration box has been successfully matched;

a third matching submodule configured to match the to-be-matched information corresponding to the to-be-matched box based on the calibration box information of the calibration box which has not been marked with a preset identifier, and, upon successful matching, to mark the calibration box which is successfully matched with the to-be-matched information corresponding to the to-be-matched box with the preset identifier;

a third determination submodule configured to determine a matching result of the calibration box information based on the marking conditions of the plurality of calibration boxes for the preset identifier.

In an exemplary implementation, the third determination submodule is configured to:

if it is determined that the plurality of calibration boxes are all marked with the preset identifier, it is determined that the matching result of the calibration box information is matching success; if it is determined that at least one of the plurality of calibration boxes is not marked with the preset identifier, it is determined that the matching result of the calibration box information is matching failure.

In an example implementation, the to-be-matched image belongs to a frame of image in consecutive frames of images in a preset first time period; said apparatus further comprises:

a second determination module configured to, if it is determined that the matching result of the to-be-matched image is matching success, determine the to-be-matched image as a matching result image corresponding to the preset first time period;

a first updating module configured to if it is determined that the matching result of the to-be-matched image is matching failure, update the to-be-matched image based on a frame of image within the preset first time period next to the to-be-matched image, continues to trigger the first identification module, until it is determined that the matching result of the to-be-matched image is matching success.

In an exemplary implementation, the preset first time period belongs to one of a plurality of preset time periods, said apparatus further comprises:

a third determination module configured to determine a preset number of target output images based on matching result images corresponding to said plurality of preset time periods respectively;

a display module configured to display the preset number of target output images.

In an exemplary implementation, the third determination module comprises:

a fourth determination submodule configured to determine whether there is a free slot in the preset number of slots after a matching result image corresponding to the preset first time period is determined; wherein the preset number of slots are used to store the preset number of target output images;

a first deposit submodule configured to, when it is determined that there is a free slot in the preset number of slots, deposit a matching result image corresponding to the preset first time period into the free slot;

a first updating submodule configured to, when it is determined that there is no free slot in the preset number of slots, update the preset number of slots based on the matching result of the matching result image.

In an exemplary implementation, the first update submodule is configured to, when it is determined that there is no free slot in the preset number of slots, determine the preset number of images from the matching result image and the images occupying the preset number of slots randomly, and store the preset number of images in the preset number of slots.

In the image matching apparatus provided by embodiments of the present disclosure, first, determining an to-be-matched image, and performing target object identification on the to-be-matched image; if it is determined that a target object is present in the to-be-matched image, determining, in the to-be-matched image, a to-be-matched box that contains the target object, and acquiring to-be-matched information that corresponds to the to-be-matched box, then matching the to-be-matched information corresponding to the to-be-matched box with calibration box information corresponding to the to-be-matched image, so as to obtain a matching result of the calibration box information; and finally based on the matching result, determining a matching result of the to-be-matched image. An embodiment of the present disclosure determines the matching result of the to-be-matched image by matching with a pre-calibrated calibration box information corresponding to the to-be-matched image, and based on the image matching method provided in the embodiment of the present disclosure, functions of image and video application products can be enriched, and the user's experience of using the application products can be improved.

In addition to the method and apparatus described above, embodiments of the present disclosure provide a computer-readable storage medium having instructions stored therein, the instructions, when running on a terminal device, causing the terminal device to implement the image matching method described in embodiments of the present disclosure. The computer-readable storage medium may be a non-transitory computer-readable storage medium.

Embodiments of the present disclosure also provide a computer program product comprising computer programs/instructions, which, when executed by a processor, implement the image matching method described in embodiments of the present disclosure.

Figure 4:
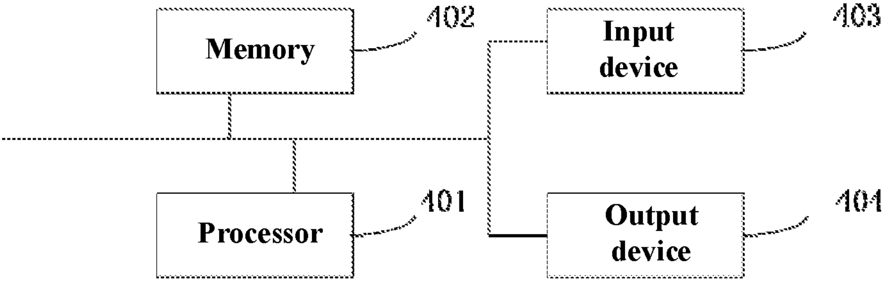
FIG. 4 illustrates a schematic structural diagram of an image matching device provided by an embodiment of the present disclosure.

In addition, embodiments of the present disclosure provide an image matching device, as seen in FIG. 4, which may include:

a processor 401, a memory 402, an input device 403, and an output device 404. The number of processors 401 in the image matching device may be one or more, wherein one processor is exemplified in FIG. 4. In some embodiments of the present disclosure, the processor 401, the memory 402, the input device 403, and the output device 404 may be connected via a bus or in other ways, wherein connection via a bus is taken as an example in FIG. 4.

The memory 402 may be configured to store software programs as well as modules, and the processor 401 performs multiple functional applications as well as data processing of the image matching device by running the software programs as well as modules stored in the memory 402. The memory 402 may primarily include a program storage area and a data storage area, wherein the program storage area may store an operating system, applications required by at least one function, and the like. In addition, the memory 402 may include a high-speed random access memory, and may also include a non-volatile memory, such as at least one disk memory device, a flash memory device, or other volatile solid state memory device. The input device 403 may be used to receive input numeric or character information, as well as to generate signal inputs related to user settings and function control of the image matching device.

In this embodiment, in accordance with the following instructions, the processor 401 will load executable files corresponding to processes of one or more applications into the memory 402, and the processor 401 will run the applications stored in the memory 402, so as to realize multiple functions of the above-described image matching device.

It should be noted that in this paper, relational terms such as “first” and “second” are only used to distinguish one entity or operation from another entity or operation, and do not necessarily require or imply any actual relationship or order between these entities or operations. Furthermore, the terms “include”, “including” or any other variant thereof are intended to cover non-exclusive inclusion, so that a process, method, article or equipment that includes a series of elements includes not only those elements, but also other elements not explicitly listed, or elements inherent to such process, method, article or equipment. Without further limitation, the element defined by the sentence “including a . . . ” does not exclude that there are other identical elements in the process, method, article or equipment including the element.

What is claimed is:

1. An image matching method comprising:

determining a to-be-matched image and performing target object identification on the to-be-matched image;

in response to it being identified that a target object is present in the to-be-matched image, determining, in the to-be-matched image, a to-be-matched box that contains the target object, and acquiring to-be-matched information that corresponds to the to-be-matched box;

matching the to-be-matched information corresponding to the to-be-matched box with calibration box information corresponding to the to-be-matched image, so as to obtain a matching result of the calibration box information; wherein the calibration box information is obtained based on reference line calibration shown on a standard image corresponding to the to-be-matched image; and determining a matching result of the to-be-matched image on the basis of the matching result of the calibration box information, wherein the calibration box information comprises calibration position information of the calibration box obtained based on the reference line calibration shown on the standard image, and the to-be-matched information corresponding to the to-be-matched box comprises to-be-matched position information of the to-be-matched box;

and wherein, the matching the to-be-matched information corresponding to the to-be-matched box with calibration box information corresponding to the to-be-matched image, so as to obtain a matching result of the calibration box information, comprises:

acquiring the calibration position information from the calibration box information corresponding to the to-be-matched image;

matching the to-be-matched position information of the to-be-matched box with the calibration position information, so as to obtain a position matching result of the calibration box corresponding to the calibration position information;

determining, based on the position matching result of the calibration box, a matching result of the calibration box information corresponding to the to-be-matched image.

2. The method of claim 1, wherein the calibration box information further comprises calibration keypoint information pre-configured for the calibration box, and the to-be-matched information corresponding to the to-be-matched box comprises to-be-matched keypoint information in the to-be-matched box;

after the matching the to-be-matched position information of the to-be-matched box with the calibration position information, so as to obtain a position matching result of the calibration box corresponding to the calibration position information, the method further comprises:

in response to it being determined that the position matching result is matching success, matching the to-be-matched keypoint information in the to-be-matched box with the calibration keypoint information corresponding to the calibration box, so as to obtain a keypoint matching result of the calibrated box;

the determining, based on the position matching result of the calibration box, a matching result of the calibration box information corresponding to the to-be-matched image further comprises:

determining the matching result of calibration box information corresponding to the to-be-matched image based on the keypoint matching result of the calibration box.

3. The method of claim 2, wherein the target object comprises at least one of a hand and a foot, and the calibration keypoint information comprises at least one of hand keypoint information and foot keypoint information.

4. The method of claim 1, wherein the calibration box information corresponding to the to-be-matched image comprises calibration box information corresponding to each of the plurality of calibration boxes;

the matching the to-be-matched information corresponding to the to-be-matched box with calibration box information corresponding to the to-be-matched image, so as to obtain a matching result of the calibration box information, comprises:

determining, from the calibration box information corresponding to said plurality of calibration boxes respectively, the calibration box information of the calibration box which has not been marked with a preset identifier; wherein the preset identifier is used to characterize that the corresponding calibration box has been successfully matched;

matching the to-be-matched information corresponding to the to-be-matched box based on the calibration box information of the calibration box which has not been marked with a preset identifier, and, upon successful matching, to mark the calibration box which is successfully matched with the to-be-matched information corresponding to the to-be-matched box with the preset identifier;

determining a matching result of the calibration box information based on the marking conditions of the plurality of calibration boxes for the preset identifier.

5. The method of claim 4, wherein the determining a matching result of the calibration box information based on the marking conditions of the plurality of calibration boxes for the preset identifier, comprises:

in response to it being determined that the plurality of calibration boxes are all marked with the preset identifier, determining that the matching result of the calibration box information is matching success; in response to it being determined that at least one of the plurality of calibration boxes is not marked with the preset identifier, it is determined that the matching result of the calibration box information is matching failure.

6. The method of claim 1, wherein the to-be-matched image belongs to a frame of image in consecutive frames of images in a preset first time period; and after the determining a matching result of the to-be-matched image on the basis of the matching result of the calibration box information, the method further comprises:

in response to it being determined that the matching result of the to-be-matched image is matching success, determining the to-be-matched image as a matching result image corresponding to the preset first time period;

in response to it being determined that the matching result of the to-be-matched image is matching failure, updating the to-be-matched image based on a frame of image within the preset first time period next to the to-be-matched image, continues to trigger execution of the identifying step of performing target object identification on the to-be-matched image, until it is determined that the matching result of the to-be-matched image is matching success.

7. The method of claim 6, wherein the preset first time period belongs to one of a plurality of preset time periods, and the method further comprises:

determining a preset number of target output images based on matching result images corresponding to said plurality of preset time periods respectively;

displaying the preset number of target output images.

8. The method of claim 7, wherein the determining a preset number of target output images based on matching result images corresponding to said plurality of preset time periods respectively, comprises:

determining whether there is a free slot in a preset number of slots after a matching result image corresponding to the preset first time period is determined; wherein the preset number of slots are used to store the preset number of target output images;

in response to it being determined that there is a free slot in the preset number of slots, depositing a matching result image corresponding to the preset first time period into the free slot;

in response to it being determined that there is no free slot in the preset number of slots, updating the preset number of slots based on the matching result of the matching result image.

9. The method of claim 8, wherein the updating the preset number of slots based on the matching result of the matching result image, comprises:

determining the preset number of images from the matching result image and the images occupying the preset number of slots randomly, and storing the preset number of images in the preset number of slots.

10. A non-transitory computer-readable storage medium, said computer-readable storage medium having instructions stored therein which, when running on a terminal device, cause said terminal device to implement:

determining a to-be-matched image and performing target object identification on the to-be-matched image;

in response to it being identified that a target object is present in the to-be-matched image, determining, in the to-be-matched image, a to-be-matched box that contains the target object, and acquiring to-be-matched information that corresponds to the to-be-matched box;

matching the to-be-matched information corresponding to the to-be-matched box with calibration box information corresponding to the to-be-matched image, so as to obtain a matching result of the calibration box information; wherein the calibration box information is obtained based on reference line calibration shown on a standard image corresponding to the to-be-matched image; and determining a matching result of the to-be-matched image on the basis of the matching result of the calibration box information, wherein the calibration box information comprises calibration position information of the calibration box obtained based on the reference line calibration shown on the standard image, and the to-be-matched information corresponding to the to-be-matched box comprises to-be-matched position information of the to-be-matched box;

wherein the instructions, when running on a terminal device, cause said terminal device to match the to-be-matched information corresponding to the to-be-matched box with calibration box information corresponding to the to-be-matched image, so as to obtain a matching result of the calibration box information, by:

acquiring the calibration position information from the calibration box information corresponding to the to-be-matched image;

matching the to-be-matched position information of the to-be-matched box with the calibration position information, so as to obtain a position matching result of the calibration box corresponding to the calibration position information;

determining, based on the position matching result of the calibration box, a matching result of the calibration box information corresponding to the to-be-matched image.

11. A device comprising: a memory storing a computer program thereon and a processor, wherein the computer program, when executed by the processor, cause the processor to implement:

determining a to-be-matched image and performing target object identification on the to-be-matched image;

in response to it being identified that a target object is present in the to-be-matched image, determining, in the to-be-matched image, a to-be-matched box that contains the target object, and acquiring to-be-matched information that corresponds to the to-be-matched box;

matching the to-be-matched information corresponding to the to-be-matched box with calibration box information corresponding to the to-be-matched image, so as to obtain a matching result of the calibration box information; wherein the calibration box information is obtained based on reference line calibration shown on a standard image corresponding to the to-be-matched image; and determining a matching result of the to-be-matched image on the basis of the matching result of the calibration box information, wherein the calibration box information comprises calibration position information of the calibration box obtained based on the reference line calibration shown on the standard image, and the to-be-matched information corresponding to the to-be-matched box comprises to-be-matched position information of the to-be-matched box; and wherein the computer program, when executed by the processor, cause the processor to match the to-bematched information corresponding to the to-be-matched box with calibration box information corresponding to the to-be-matched image, so as to obtain a matching result of the calibration box information, by:

acquiring the calibration position information from the calibration box information corresponding to the to-be-matched image;

matching the to-be-matched position information of the to-be-matched box with the calibration position information, so as to obtain a position matching result of the calibration box corresponding to the calibration position information;

determining, based on the position matching result of the calibration box, a matching result of the calibration box information corresponding to the to-be-matched image.

12. The device of claim 11, wherein the calibration box information further comprises calibration keypoint information pre-configured for the calibration box, and the to-be-matched information corresponding to the to-be-matched box comprises to-be-matched keypoint information in the to-be-matched box;

wherein the computer program, when executed by the processor, cause the processor to, after the matching the to-be-matched position information of the to-be-matched box with the calibration position information, so as to obtain a position matching result of the calibration box corresponding to the calibration position information, further implement:

in response to it being determined that the position matching result is matching success, matching the to-be-matched keypoint information in the to-be-matched box with the calibration keypoint information corresponding to the calibration box, so as to obtain a keypoint matching result of the calibrated box;

the determining, based on the position matching result of the calibration box, a matching result of the calibration box information corresponding to the to-be-matched image further comprises:

determining the matching result of calibration box information corresponding to the to-be-matched image based on the keypoint matching result of the calibration box.

13. The device of claim 11, wherein the calibration box information corresponding to the to-be-matched image comprises calibration box information corresponding to each of the plurality of calibration boxes;

wherein the computer program, when executed by the processor, cause the processor to match the to-be-matched information corresponding to the to-be-matched box with calibration box information corresponding to the to-be-matched image, so as to obtain a matching result of the calibration box information, by:

determining, from the calibration box information corresponding to said plurality of calibration boxes respectively, the calibration box information of the calibration box which has not been marked with a preset identifier; wherein the preset identifier is used to characterize that the corresponding calibration box has been successfully matched;

matching the to-be-matched information corresponding to the to-be-matched box based on the calibration box information of the calibration box which has not been marked with a preset identifier, and, upon successful matching, to mark the calibration box which is successfully matched with the to-be-matched information corresponding to the to-be-matched box with the preset identifier;

determining a matching result of the calibration box information based on the marking conditions of the plurality of calibration boxes for the preset identifier.

14. The device of claim 11, wherein the to-be-matched image belongs to a frame of image in consecutive frames of images in a preset first time period; and wherein the computer program, when executed by the processor, cause the processor to, after the determining a matching result of the to-be-matched image on the basis of the matching result of the calibration box information, further implement:

in response to it being determined that the matching result of the to-be-matched image is matching success, determining the to-be-matched image as a matching result image corresponding to the preset first time period;

in response to it being determined that the matching result of the to-be-matched image is matching failure, updating the to-be-matched image based on a frame of image within the preset first time period next to the to-be-matched image, continues to trigger execution of the identifying step of performing target object identification on the to-be-matched image, until it is determined that the matching result of the to-be-matched image is matching success.

15. The device of claim 14, wherein the preset first time period belongs to one of a plurality of preset time periods, and wherein the computer program, when executed by the processor, cause the processor to:

determine a preset number of target output images based on matching result images corresponding to said plurality of preset time periods respectively;

display the preset number of target output images.

16. The device of claim 15, wherein the computer program, when executed by the processor, cause the processor to determine a preset number of target output images based on matching result images corresponding to said plurality of preset time periods respectively, by:

determining whether there is a free slot in a preset number of slots after a matching result image corresponding to the preset first time period is determined; wherein the preset number of slots are used to store the preset number of target output images;

in response to it being determined that there is a free slot in the preset number of slots, depositing a matching result image corresponding to the preset first time period into the free slot;

in response to it being determined that there is no free slot in the preset number of slots, updating the preset number of slots based on the matching result of the matching result image.

17. The non-transitory computer-readable storage medium of claim 10, wherein the calibration box information further comprises calibration keypoint information pre-configured for the calibration box, and the to-be-matched information corresponding to the to-be-matched box comprises to-be-matched keypoint information in the to-be-matched box;

wherein the instructions, when running on a terminal device, cause said terminal device to, after the matching the to-be-matched position information of the to-be-matched box with the calibration position information, so as to obtain a position matching result of the calibration box corresponding to the calibration position information, further implement:

in response to it being determined that the position matching result is matching success, matching the to-be-matched keypoint information in the to-bematched box with the calibration keypoint information corresponding to the calibration box, so as to obtain a keypoint matching result of the calibrated box;

the determining, based on the position matching result of the calibration box, a matching result of the calibration box information corresponding to the to-be-matched image further comprises:

determining the matching result of calibration box information corresponding to the to-be-matched image based on the keypoint matching result of the calibration box.

18. The non-transitory computer-readable storage medium of claim 10, wherein the calibration box information corresponding to the to-be-matched image comprises calibration box information corresponding to each of the plurality of calibration boxes;

wherein the instructions, when running on a terminal device, cause said terminal device to match the to-be-matched information corresponding to the to-be-matched box with calibration box information corresponding to the to-be-matched image, so as to obtain a matching result of the calibration box information, by:

determining, from the calibration box information corresponding to said plurality of calibration boxes respectively, the calibration box information of the calibration box which has not been marked with a preset identifier; wherein the preset identifier is used to characterize that the corresponding calibration box has been successfully matched;

matching the to-be-matched information corresponding to the to-be-matched box based on the calibration box information of the calibration box which has not been marked with a preset identifier, and, upon successful matching, to mark the calibration box which is successfully matched with the to-be-matched information corresponding to the to-be-matched box with the preset identifier;

determining a matching result of the calibration box information based on the marking conditions of the plurality of calibration boxes for the preset identifier.

* * * * *